United States Patent [19]

Carmi et al.

[11] 4,059,429
[45] Nov. 22, 1977

[54] GLASS PRESSING PLUNGER COOLING

[75] Inventors: Arieh Carmi, Big Flats; Zung S. Chang, Painted Post; Thomas J. Rayeski, Corning, all of N.Y.

[73] Assignee: Corning Glass Works, Corning, N.Y.

[21] Appl. No.: 729,409

[22] Filed: Oct. 4, 1976

[51] Int. Cl.² .......................... C03B 11/06; C03B 9/38
[52] U.S. Cl. ........................................ 65/355; 65/356; 65/362
[58] Field of Search .......................... 65/355, 356, 362

[56] References Cited

U.S. PATENT DOCUMENTS

| 1,057,198 | 3/1913 | Winder | 65/356 |
| 3,054,220 | 9/1962 | Torok | 65/362 X |
| 3,148,969 | 9/1964 | Mathias | 63/356 |
| 3,258,324 | 6/1966 | Torok | 65/356 X |
| 3,997,318 | 12/1976 | Takatoki et al. | 65/362 |

Primary Examiner—S. Leon Bashore
Assistant Examiner—Frank W. Miga
Attorney, Agent, or Firm—Charles W. Gregg; Burton R. Turner; Clarence R. Patty, Jr.

[57] ABSTRACT

A differentially cooled plunger cooperative with a mold for press forming glass articles and the method of cooling pressed glass articles formed in said mold by use of the pressing plunger. The plunger is designed so that cooling fluid may be supplied from a single source thereof to different zones or regions of the plunger for differential cooling of the zones or regions and of a glass article press formed by the plunger.

2 Claims, 3 Drawing Figures

GLASS PRESSING PLUNGER COOLING

BACKGROUND OF THE INVENTION

In glass pressing, the rapid and controlled exchange of heat between the glass and the mold equipment is extremely important. It is particularly important that the temperatures of the mold equipment be kept within a range which is most advantageous for the pressing process. This temperature should be closely below the "sticking" temperature at which the glass tends to adhere to the mold equipment and, on the other hand, the temperature should not be allowed to drop below the optimum forming-temperature range because this may cause optical defects or checks in the product. In the pressing of glass, the rate of heat removal from the molten glass by the mold equipment depends to a large extent on the glass thickness and its geometric shape in localized regions. If the glass item to be produced has regions of both broad flat or slightly curved surfaces and also regions of relatively sharp corners, the rate of heat exchange between the glass and the mold equipment can differ significantly from adjacent ones of such regions to the next. Under such circumstances the conventional cooling systems for plungers used in glass pressing are inadequate in handling the cooling rates in adjacent ones of said regions or zones because present methods of cooling plungers involve a single source of cooled fluid entering the plunger in one single chamber, being distributed in various locations and generally collected at a single location with resultant individually varying return flow paths which affect one another causing arbitrary and undesirable side effects in the cooling system design and in plunger thermal performance.

In order to overcome the above discussed deficiencies in the pressing of glass items with substantial geometric shape variations such as those mentioned, the present plunger cooling system has been developed and, accordingly, it is an object of the present invention to provide a method of and apparatus for independently obtaining regional or localized control of temperatures on the exterior or glass pressing surfaces of plungers used for pressing glass articles with significantly large variations in the geometric configurations of different regions or zones thereof, such as, for example, articles having relatively sharp corners.

Other objects and characteristic features of the invention will become apparent as the description proceeds.

SUMMARY OF THE INVENTION

The invention is believed to be adequately summarized in the foregoing abstract of the disclosure and, therefore, for the sake of brevity and to prevent repetition or redundancy to the extent possible, no further summary of the invention will be given nor is any believed necessary.

BRIEF DESCRIPTION OF THE DRAWINGS

Similar reference characters refer to similar parts in each of the drawing Figs.

PREFERRED EMBODIMENT OF THE INVENTION

Figure 1:
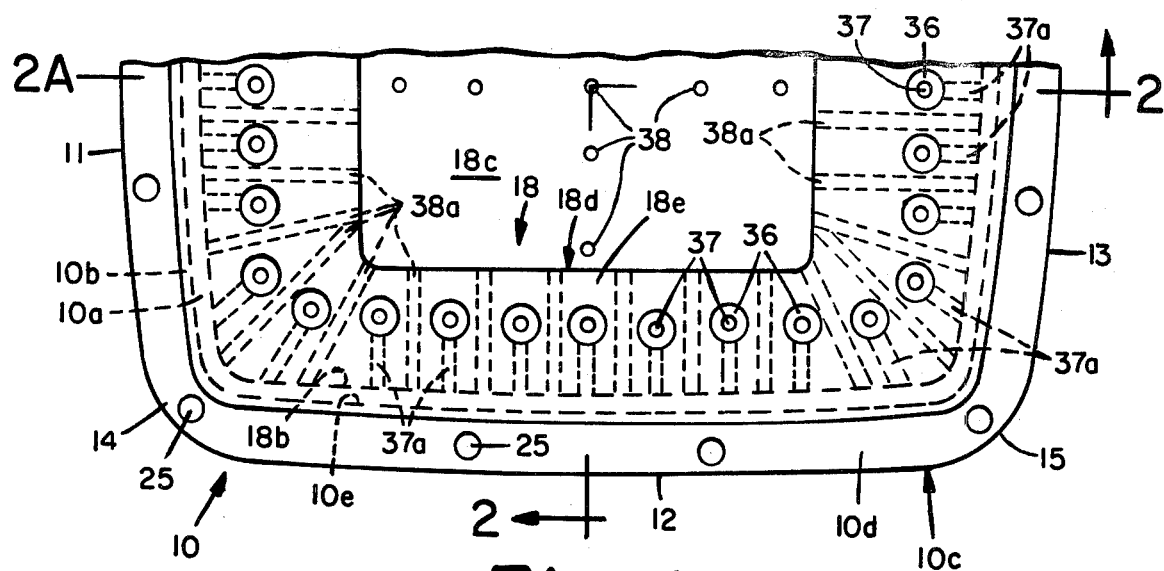
FIG. 1 is a top plan view of slightly more than half of one form of a glass forming plunger embodying the invention, such plunger being symmetrical on opposite sides of a center line 2—2A extending through such drawing Fig.
Figure 2:
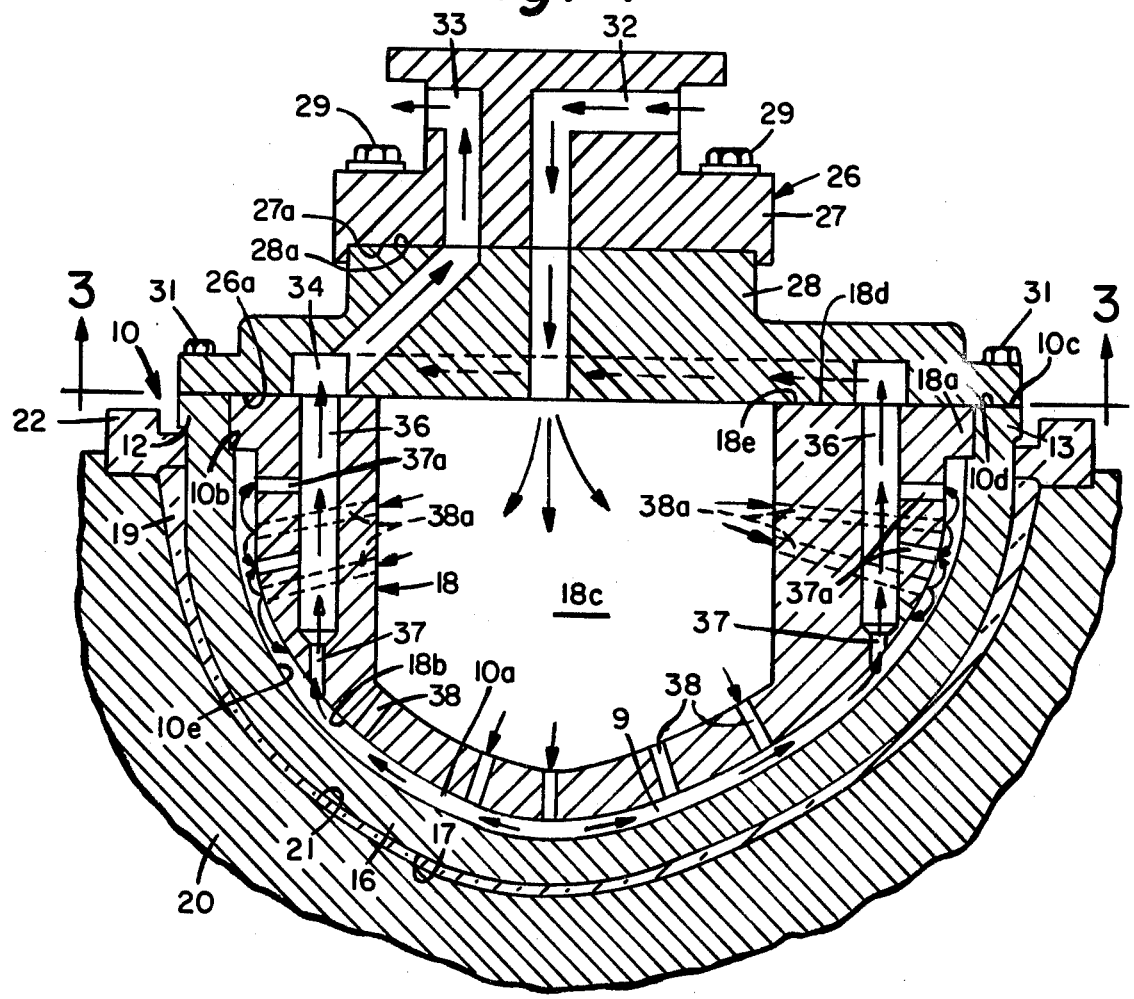
FIG. 2 is a cross-sectional elevational view of the glass pressing plunger of FIG. 1, such view being taken generally along line 2—2 of FIG. 1 and also including, in cross-section, a support member for said plunger, and a portion of a forming mold and ring mold complemental to the plunger and cooperative therewith.

Referring to the drawings in detail, there is shown in FIGS. 1 and 2 a glass pressing plunger 10 embodying a hollow 10a and having upper sides such as 11, 12 and 13 whose glass contacting surfaces are relatively straight in a vertically extending direction (FIG. 2) and are only slightly curved in a horizontal direction (FIG. 1) but which converge with each other in relatively sharply curved or sharp corner regions such as 14 and 15 (FIG. 1) of the plunger. Said sides and corner regions join with a gradually curved lower region 16 (FIG. 2) of said plunger to complete a press forming outer surface 17 on such plunger. Plunger 10 embodies within the hollow 10a thereof and, near the upper surface 10d of the annular rim 10c of the plunger, a narrow ledge 10b which extends annularly and uniformly about said hollow for support therein of a baffle or baffle member 18 as discussed below. Plunger 10 is shown in FIG. 2 in a position when pressing a glass article 19 between said forming surface 17 of the plunger and the glass forming surface 21 of a cooperative forming mold 20. A neck ring mold 22 of a usual and well known type is also shown in FIG. 2 resting on the upper surface of mold 20, the inner periphery of such neck ring mold closely fitting the outer perimeter of plunger 10 near said upper rim 10c of such plunger.

The outer surface 18b of the above mentioned baffle or baffle member 18 is substantially similar in shape to the configuration of said hollow 10a in plunger 10 but is of slightly smaller size over all of the baffle except adjacent the upper rim 18d thereof where the baffle is provided with an annular shoulder portion 18a which fits snugly within the upper part of plunger 10 with the bottom surface of shoulder portion 18a resting on said ledge 10b of the plunger for support of the baffle as mentioned above and as shown in FIG. 2. Such arrangement provides a relatively shallow cooling fluid flow channel or space 9 in cavity 10a of plunger 10, such space being located between outer surface 18b of baffle 18 and an inner surface 10e of plunger 10 which defines the limits of said hollow 10a in the plunger. Baffle 18 also embodies a cooling fluid plenum chamber 18c of a substantially large volume. Baffle 18 will be further discussed hereinafter.

Upper surface 10d of the annular rim 10c of plunger 10 (FIGS. 1 and 2) and the upper surfaces 18e of the generally annular rim 18d of baffle 18 extend horizontally precisely even with each other to provide for hermetic sealing between such surfaces and the lower surface 26a of a support member 26 (FIGS. 2 and 3) for the plunger and baffle. Support member 26 comprises upper and lower parts 27 and 28, respectively, which are secured to each other by suitable bolts such as 29 to provide hermetic sealing between the lower surface 27a of part 27 and the upper surface 28a of part 28. Support member 26 is secured to the aforesaid rim 10c of plunger 10 by a plurality of bolts such as 31 which extend through holes such as 26b in support 26 (FIG. 3) and are screwed into suitably threaded holes such as 25 (FIG. 1)

generally equally spaced about the annular length of rim 10c of the plunger, such arrangement providing the aforesaid hermetic sealing between surface 26a of support 26 and said surfaces 10d and 18e, respectively, of plunger 10 and baffle 18.

Figure 3:
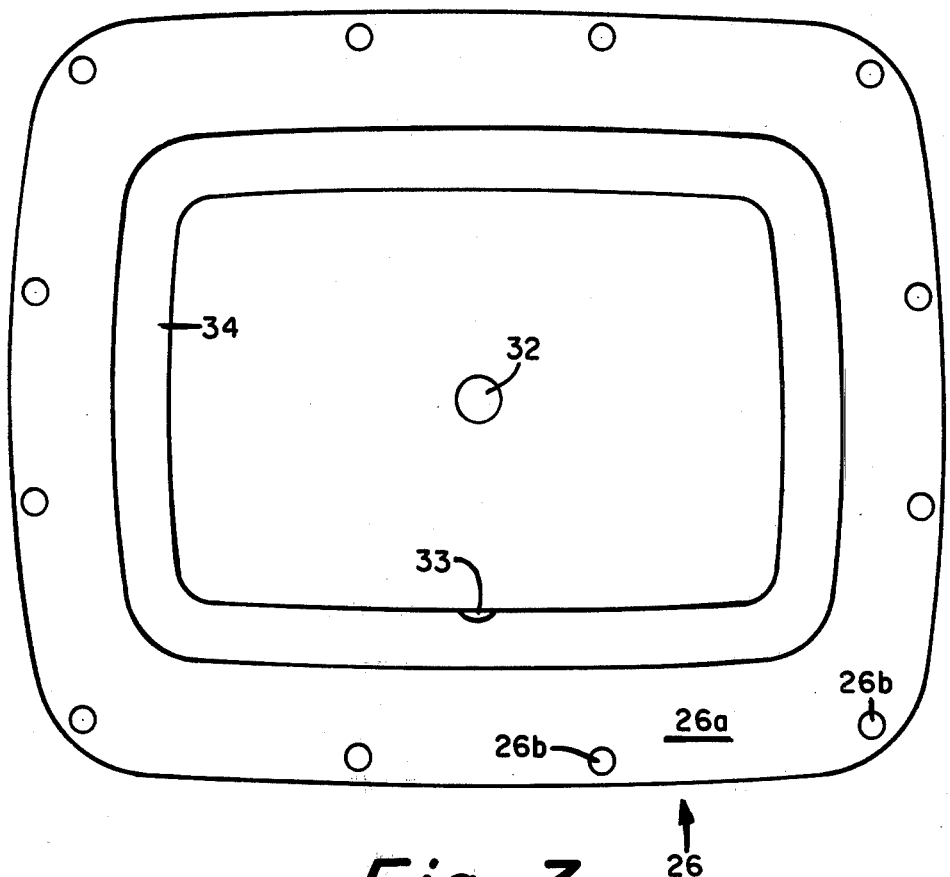
FIG. 3 is a bottom plan view of the support member shown in FIG. 2, such view being taken generally along line 3—3 of FIG. 2.

Support or support member 26 embodies a relatively large cooling fluid supply passage 32 (FIGS. 2 and 3) which extends generally vertically through the center of parts 27 and 28 of support 26 to near the top of part 27 and then extends horizontally through part 27 and opens through the outer wall of such part for connection to a suitable supply of said cooling fluid. The lower end of passage 32 opens through the lower wall of part 28 of support member 26 to connect with the aforesaid plenum chamber 18c in baffle 18. Support 26 further embodies a relatively large cooling fluid exit or exhaust passage 33 which extends horizontally for a short distance through part 27 of the support near the top thereof, then vertically through such part, and then at an angle through part 28 of support 26 to connect at its lower end with a spent cooling fluid flow channel 34 embodied in the lower surface 26a of support 26 and extending generally annularly about such surface (FIG. 3). The upper end of passage 33 opens through the outer wall of part 27 for connection to atmosphere or to a suitable sink for said cooling fluid.

Returning to FIGS. 1 and 2 and baffle or baffle member 18 shown therein, such baffle embodies a plurality of relatively large cooling fluid exhaust passages such as 36 extending vertically, from the upper surface 18e of the baffle and opening through such surface, to near the outer surface 18b of the baffle where the lower ends of the passages connect with relatively short and small vertical fluid flow exhaust passages or orifices such as 37 whose lower ends open through said outer surface 18b to connect with the aforesaid cooling fluid flow channel or space 9 in cavity 10a of plunger 10 and located between said surface 18b of baffle 18 and surface 10e of the plunger. The upper ends of the passages such as 36 connect with the aforesaid cooling fluid flow exhaust channel 34 provided in support 26. An additional plurality of relatively short and small fluid flow exhaust passages or orifices such as 37a extend laterally through the sides of baffle 18 and connect with said cooling fluid flow space or channel 9 in cavity 10a of plunger 10 and said relatively large exhaust passages such as 36.

Baffle 18 also embodies a plurality of relatively small fluid flow supply passages or orifices such as 38 which extend downwardly from plenum chamber 18c in baffle 18 and through the lower part of the baffle to connect with said cooling fluid flow channel or space 9 in cavity 10a of plunger 10. A multiplicity of further relatively small fluid flow supply passages or orifices such as 38a extend laterally through baffle 18 to connect plenum chamber 18c with the cooling fluid flow space 9 in cavity 10a of plunger 10 above the above mentioned lower part of the baffle and between the aforesaid exhaust passages such as 37 and 37a extending through baffle 18 as best shown in FIG. 2.

OPERATIONAL EXAMPLE OF THE INVENTION

For the purpose of a ready understanding of the invention, there is provided in FIG. 2, to the extent possible without confusion with the reference characters shown therein, a plurality of arrows intended to illustrate, by a brief view of such figure, the internal flow paths of cooling fluid through the apparatus or structure of the invention.

When employing the apparatus of the invention, cooling fluid supply passage 32 is connected to a suitable source of such fluid as previously mentioned and cooling fluid exhaust passage 33 is connected to atmosphere or to a suitable fluid sink as also previously mentioned. Passage 33 is, of course, connected to atmosphere only when compressed air or other aeriform fluid which, for one reason or another, it is not desired to save, is used for the cooling fluid.

As shown in FIG. 2 by the aforesaid arrows, the cooling fluid flows through passage 32 down through support 26 and thence into plenum chamber 18c of baffle 18 where it spreads out and fills such chamber with a major part of the fluid flowing through said passages such as 38a extending laterally through the baffle, such fluid then impinging on surface 10e of plunger 10 near the upper part of such surface and in the sharp corner regions or areas such as 14 and 15 thereof to cool such part or region. Said major part of the cooling fluid then flows through the small lateral exhaust passages such as 37a into the large exhaust passages such as 36 and thence into exhaust channel 34 and through and out of passage 33 to the aforesaid atmosphere or fluid sink. The minor part of the cooling fluid flows from plenum chamber 18c through the small supply passages such as 38 to impinge on the lower part of surface 10e of plunger 10 and then flow to the small vertical exhaust passsages such as 37 connecting with the lower ends of the large exhaust passages such as 36 and into the latter passages to join with the spent fluid from the exhaust passages such as 37a and exit with the latter spent fluid out of passage 33 as mentioned above.

It is believed expedient to here point out that the apparatus of the present invention provides for cooling of a pressing plunger in regions, areas or zones thereof having high heat removal requirements without unduly affecting zones of lower heat removal requirements. For example, it will be noted that baffle 18 is of substantial thickness particularly in the regions or zones requiring high heat removal rates, that is, in the upper regions or zones of plunger 10 and of a glass article such as 19 formed by such plunger and a cooperative mold 20, such region or zones being, for example, the corners or corner regions of plunger 10. As previously mentioned with reference to FIG. 2, the major amount of cooling fluid flows from plenum chamber 18c of baffle 18 through the passages such as 38a and thence through the upper part of the cooling fluid flow space or channel 9 of cavity 10a of plunger 10 where there are high heat removal requirements, the fluid then flowing out through the exhaust passages such as 37a. At the same time, the remainder or minor part of said fluid flows through the holes such as 38 in the lower part of baffle 18 to flow through the lower part of said cooling fluid channel or space 9 in cavity 10a and out through the exhaust passages such as 37. Thus the cooling effect in the zones or regions of plunger 10 having low heat removal requirements is substantially less than in said zones or regions having high heat removal requirements.

It is further pointed out that plunger 10 could have a substantially less curvature in the lower region thereof, that is, be somewhat more flat in such region and, in the use of such a shaped plunger with, of course, a complimentally shaped and cooperative mold, the principles of plunger cooling herein disclosed would still be applicable.

It should also be pointed out that the cooling fluid employed in practicing the invention disclosed can, for example, be air from a fan, compressed air, water, an air-water mixture or any other suitable heat transfer fluid.

Although there is herein shown and described only one specific form of apparatus embodying the invention, it will be understood that such is not to be considered in any way limiting but that various changes or modifications may be made therein within the purview of the appended claims without departing from the spirit and scope thereof.

What is claimed is:

1. In a hollow plunger (10) including corner regions (14, 15) of relatively sharp curvature joining regions (11, 12, 13) of substantially lesser curvature and for press forming in a complimental mold (20) a glass article (19) having similarly curved regions and a support member (26) for said plunger, apparatus for differentially cooling said regions, such apparatus comprising; a baffle member (18) disposed in the hollow of said plunger and providing a cooling fluid flow channel (9) between the outer surface (18b) of the baffle member (18) and the inner surface (10e) of the plunger (10) such baffle member (18) embodying,
    A. a cooling fluid supply plenum chamber (18c),
    B. a plurality of cooling fluid flow passages (38, 38a) connecting said plenum chamber (18c) with said cooling fluid flow channel (9) there being a substantially greater number of such passages in said corner regions (14, 15) of the plunger (10) than in said regions (11, 12, 13) thereof of lesser curvature, and
    C. a plurality of spent cooling fluid exhaust passages (36, 37, 37a) connecting said fluid flow channel (9) with spent cooling fluid exhaust passages (33, 34) embodied in said support member (26) there being a substantially greater number of said spent cooling fluid exhaust passages in said corner regions (14, 15) of the plunger (10) than in said regions (11, 12, 13) thereof of lesser curvature.

2. In a plunger (10) including relatively sharply curved regions (14, 15) joining regions (11, 12, 13) of substantially lesser curvature and for press forming in a cooperative mold (20) a glass article (19) having similarly curved regions, apparatus providing for differential cooling of said regions, such apparatus comprising, in combination;
    I. a cavity (10a) embodied in said plunger;
    II. a baffle member (18) in said cavity (10a) such member embodying,
        A. an outer surface (18b) with a configuration similar to such cavity (10a) but of a smaller size to provide a shallow cooling fluid flow channel (9) surrounding said surface (18b),
        B. walls of a substantial thickness in said sharply curved regions (14, 15) of said plunger (10) and of a lesser thickness in said regions (11, 12, 13) of lesser curvature of the plunger (10),
        C. a relatively large cooling fluid plenum chamber (18c),
        D. a relatively large plurality of small cooling fluid supply passages (38a) connecting said plenum chamber (18c) with said fluid flow channel (9) in areas thereof adjacent said sharply curved regions (14, 15) of said plunger (10),
        E. a substantially smaller plurality of small cooling fluid supply passages (38) connecting said plenum chamber (18c) with said fluid flow channel (9) in areas thereof adjacent said regions (11, 12, 13) of lesser curvature of said plunger (10),
        F. a plurality of relatively large generally vertically extending cooling fluid exhaust passages (36) located in said baffle member (18) adjacent the outer periphery thereof,
        G. a relatively large plurality of small cooling fluid exhaust passages (37a) connecting said large cooling fluid exhaust passages (36) with said fluid flow channel (9) in areas thereof adjacent said sharply curved regions (14, 15) of said plunger (10) and
        H. a substantially smaller quantity of small cooling fluid exhaust passages (37) connecting said large cooling fluid exhaust passages (36) with said fluid flow channel (9) in areas thereof adjacent said regions (11, 12, 13) of lesser curvature of said plunger (10) and
    III. a support member (26) attached to the top of said plunger (10) and baffle member (18) in a hermetic relationship therewith, such support member (26) embodying,
        A. a first passage (32) connecting with said plenum chamber (18c) for supplying cooling fluid thereto, and
        B. a second passage (33) connecting with said plurality of relatively large cooling fluid exhaust passages (36) for exhausting of spent cooling fluid from said baffle member (18).

* * * * *